T867009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 749

819,948

HIGH CONTRAST ELEMENTS AND FILM DEVELOPERS CONTAINING NITRON AND POLYALKYLENE GLYCOL

Lewis T. Connolly and Eugene D. Salesin, both %
Kodak Park Division, Rochester, N.Y. 14650

Filed Apr. 28, 1969. Published Oct. 21, 1969
Int. Cl. G03c *5/30*
U.S. Cl. 96—66
No Drawing. 17 Pages Specification

High contrast photographic elements comprising a support and photographic silver halide to which nitron and polyalkylene glycol or a derivative thereof has been added; a developer, for high contrast photographic elements, comprising nitron and the use of said developer in the process of developing high contrast photographic elements of improved dot quality.